United States Patent [19]

Stephenson

[11] Patent Number: 5,416,543
[45] Date of Patent: May 16, 1995

[54] CAMERA HAVING SELECTIVE INHIBITION OF OPERATION BASED ON FILM SPEED

[75] Inventor: Stanley W. Stephenson, Spencerport, N.Y.

[73] Assignee: Eastman Kodak Company, Rochester, N.Y.

[21] Appl. No.: 234,444

[22] Filed: Apr. 28, 1994

[51] Int. Cl.$^6$ .............................................. G03B 7/00
[52] U.S. Cl. ........................................................ 354/21
[58] Field of Search ................. 354/21, 412, 413, 416, 354/127.1, 145.1, 149.1, 149.11

[56] References Cited

U.S. PATENT DOCUMENTS

| | | | |
|---|---|---|---|
| 3,696,721 | 10/1972 | Wagner | 354/421 |
| 4,003,062 | 1/1977 | Galbraith, Jr. | 354/21 |
| 4,078,240 | 3/1978 | Kaneko et al. | 354/33 |
| 4,293,204 | 10/1981 | Wagner et al. | 354/21 |
| 4,450,506 | 5/1984 | Hasegawa | 362/4 |
| 4,586,800 | 5/1986 | Tominaga et al. | 354/21 |
| 4,603,958 | 8/1986 | Maruyama et al. | 354/414 |
| 4,693,574 | 9/1987 | Ohnuki et al. | 354/21 |
| 4,714,332 | 12/1987 | Eguchi et al. | 354/21 |
| 4,783,672 | 11/1988 | Wirtz et al. | 354/21 |
| 4,839,687 | 6/1989 | Taniguchi et al. | 354/416 |
| 4,939,534 | 7/1990 | Taniguchi et al. | 354/416 |
| 5,049,916 | 9/1991 | O'Such et al. | 354/412 |
| 5,093,681 | 3/1992 | Matsuzaki et al. | 354/416 |

Primary Examiner—Howard B. Blankenship
Attorney, Agent, or Firm—Peter J. Bilinski

[57] ABSTRACT

A camera is provided that is capable of exposing films of various speeds comprising a flash unit capable of alternatively assuming a direct flash mode and an indirect flash mode and a film speed detector to determine if the speed of film in the camera is above or below a predetermined speed. According to the invention, a control apparatus connected to the film speed detector and the flash unit prevents the flash unit from assuming one of the flash modes if the film in the camera is below the predetermined speed, but allows the flash unit to assume the other flash mode if the film is below the predetermined speed.

10 Claims, 5 Drawing Sheets

CAMERA HAVING SELECTIVE INHIBITION OF OPERATION BASED ON FILM SPEED

FIELD OF THE INVENTION

This invention relates to the field of photography and specifically to an improved flash apparatus for a camera capable of assuming multiple flash mode wherein one of the flash modes can be inhibited depending on the speed of film in the camera.

BACKGROUND OF THE INVENTION

Electronic flash systems have been developed for still photographic cameras for indirect illumination of a subject. Such flash systems have been deemed necessary in order to prevent so-called "high spots". These are brightened areas appearing at the center of an exposed photographic print caused by direct flash illumination impinging on the subject, particularly those subjects having a light colored background from which the light from the direct flash source can be more easily reflected back toward the picture taking lens. Indirect flash apparatus, on the other hand, directs light from a flash light source, ie: a flash tube, against a reference surface, such as a ceiling or a wall, from which the light is then reflected, thereby simulating natural lighting.

Indirect, or bounce flash apparatus, named due to the method of lighting described above, can be incorporated into a camera which also has direct flash illumination capability, either by providing separate flash systems, or by incorporation of a single flash unit having a movable head which can be located in either a direct flash or an indirect flash position. Such a flash device is described in U.S. Pat. No. 4,078,240, issued to Kaneko, et al.

In cameras having flash systems of the preceding type either a direct or an indirect flash mode can then be selectively engaged, either by the user or automatically through means contained within the camera to provide proper illumination for picture taking.

It is known that by positioning a flash lamp assembly in an indirect flash mode that less illumination onto a target area is provided. It has also been found that indirect flash systems sharing the same output capability as direct flash systems perform adequately when used in a camera which has been loaded with a relatively high speed film, (preferably ISO 400 or greater), in that these films have lower light sensitivities. Conversely, lower speed films (those less than ISO 400) do not provide adequate exposures given the decrease in available illumination as provided by indirect flash output. Therefore, if a conventional indirect flash system were to be utilized using a low speed film, it is possible that a user could waste a number of exposures. This problem can be alleviated by providing an enhancement of the illumination output of the bounce flash, as done in the preceding U.S. Pat. No. 4,078,240 patent, or by increasing the size of the taking lens. Each of the above enhancements, however, produce relative increases in the size and price of the camera.

There is a need therefore to provide a flash apparatus for a camera which alternatively provides for direct and indirect flash illumination, in which the camera can be prevented from operating when loaded with film which is of a insufficient speed to provide acceptable exposures in either flash mode.

SUMMARY OF THE INVENTION

The present invention is directed to solving one or more of the problems set forth above. Briefly summarized, according to one aspect of the present invention there is disclosed a camera capable of exposing various speed films comprising a flash unit capable of alternatively assuming a direct flash mode and an indirect flash mode and a film speed detector for sensing whether film loaded into the camera is above or below a predetermined speed, characterized by:

controller means connected to the flash unit and the film speed detector for preventing the flash unit from assuming one of the flash modes when film in the camera is below the predetermined speed.

According to another aspect of the present invention, there is provided a camera capable of exposing various speed films comprising a flash unit capable of alternatively assuming a direct flash mode and an indirect flash mode and a film speed detector for sensing whether film in the camera is above or below a predetermined speed, characterized by:

controller means connected to the flash unit and the film speed detector for preventing the camera from operating when the flash unit assumes at least one of the flash modes and film in the camera is below the predetermined speed.

According to yet another aspect of the invention, there is provided an electronic flash unit comprising means for alternatively assuming a direct flash mode and an indirect flash mode for use with a camera having a film speed detector for sensing whether film in the camera is above or below a predetermined speed, characterized by:

controller means connectable to the film speed detector for preventing the flash unit from assuming at least one of the flash modes when film in the camera is below the predetermined speed.

Preferably, a sensor can also be provided to sense the position of the flash assembly to determine which flash mode the camera is set to, as well as an indicator to inform the user that the camera has been disabled due to the inadequacy of proper lighting conditions for the flash mode and speed of film selected.

An advantageous feature of the present invention is that the camera is disabled when indirect flash illumination is attempted in less than effective lighting conditions without film having adequate sensitivity. This disablement allows the user to select the direct flash mode and not lose the opportunity to take a correct exposure. Obvious savings in film and user satisfaction are realized.

Another advantageous feature of the present invention is that a relatively inexpensive camera is provided having a flash apparatus which allows a user to utilize direct and indirect flash illuminations in a convenient manner to allow proper exposures to be taken.

These and other advantages and features will become apparent from the following Description of the Preferrred Embodiments when read in conjunction with the attached drawings.

DETAILED DESCRIPTION OF THE INVENTION

Terms such as "top", "bottom", "vertical", "horizontal", etc. are used herein to describe the invention in terms of the embodiments described. It should be apparent that other orientations for the parts are possible and therefore the description should not be considered to be so limiting.

Figure 1:
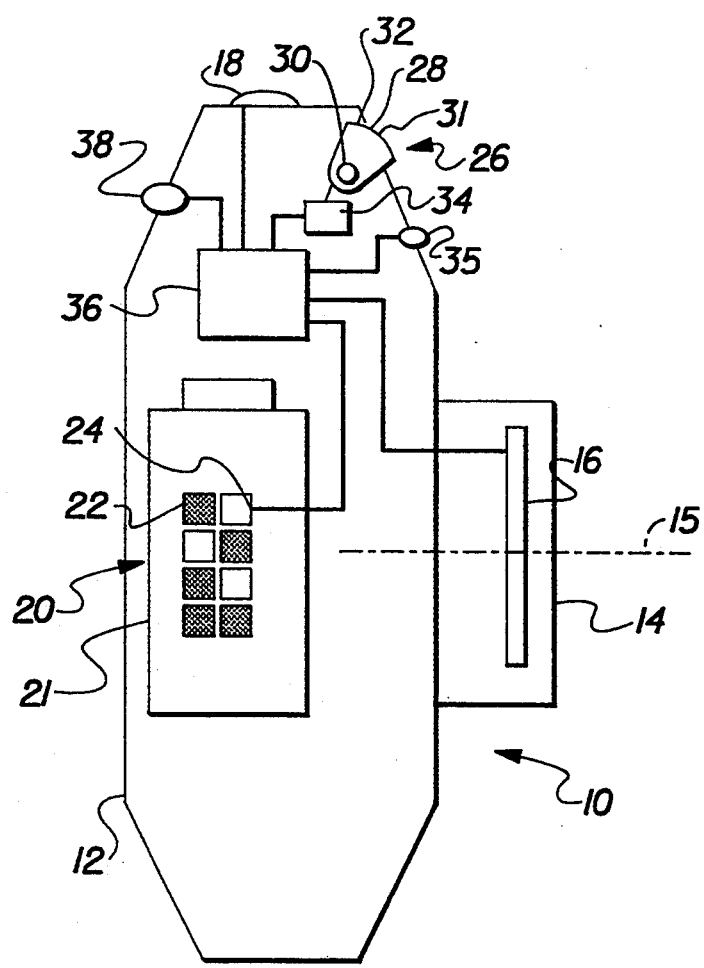
FIG. 1 is a schematic side elevational view of a camera according to a preferred embodiment of the present invention.
Figure 3:
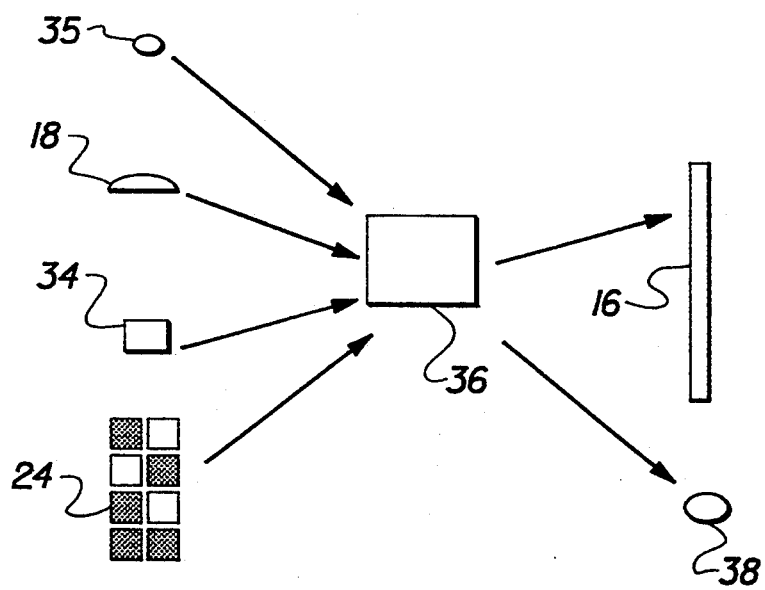
FIG. 3 is a schematic block diagram illustrating a control circuit used to inhibit the use of the camera shown in FIGS. 1 and 2 depending on the speed of the film loaded into the camera and the flash illumination mode selected.
Figure 2:
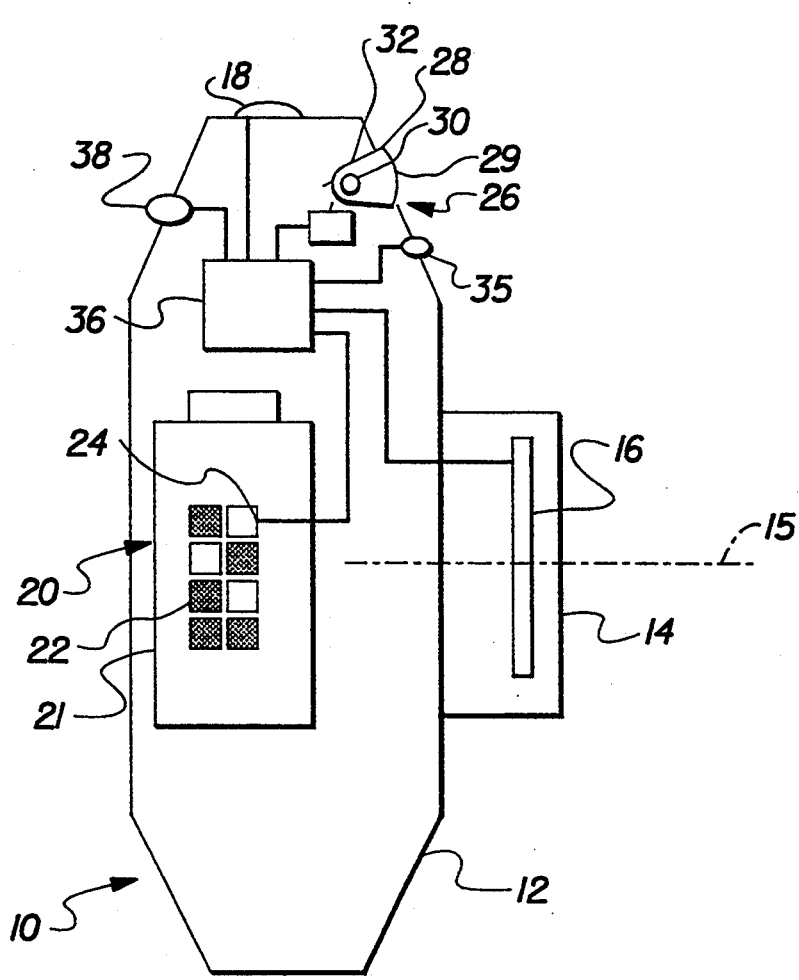
FIG. 2 is a schematic side elevational view, partially in section of the camera shown in FIG. 1 showing a flash unit oriented in a direct illumination mode.

Referring to the drawings in detail, and specifically to FIGS. 1-3, there is provided a camera 10 comprising a body 12, a taking lens 14 fitted to the body and defining an optical axis 15, a shutter mechanism 16 which can be opened and closed to allow light to enter the camera through the taking lens and a corresponding and externally accessible shutter release button 18. A cartridge or canister of film 20 is contained within an integral film cartridge receiving chamber (not shown) of the body 12 and having film contained therein on a take-up spool (also not shown).

The cartridge 20 has an exterior surface 21 having a pattern field 22 made up of a plurality of portions or patterns for coding film information. This method of coding information, commonly referred to as DX coding, provides the speed of the film contained within the cartridge 20. Each pattern is in the form of an electrode arranged to be read by a film speed detector 24. The detector 24 comprises a series of electrical contacts (not shown in the FIGS.) which are disposed in positions, such as within the film cartridge receiving chamber, and arranged to have these contacts make contact with the portions defining the pattern field 22. An example of such a detector is described more fully in U.S. Pat. No. 4,693,574, issued to Ohnuki, et al which is hereby incorporated by reference. Other sensing means, however, capable of reading film coded information presented in any form of pattern field 22 are also useful, such as by the use of optical scanners or bar code readers, each of which are commonly known in the field. Examples of those sensors include those described in U.S. Pat. Nos. 4,783,672, 4,586,800 and 4,714,332.

Camera 10 includes an electronic flash assembly 26 for illuminating a scene to be photographed and comprising a pivotable flashhead 28 having a flash tube 30 which is fitted within a trough-shaped reflector 32. The pivoting flashhead 28 is able to move from a first direct flash position 29, FIG. 2, which is substantially parallel to the optical axis 15, to a second indirect flash position 31, shown in FIG. 1. Position 31 is nominally about 45-65 degrees from the optical axis 15. A variable capacitor (not shown) provides an adequate means by which the flash tube 30 is charged for firing from a power source, such as a battery (not shown). Typically, a capacity of about 120 microfarads is sufficient for charging the variable capacitor and producing a flash illumination output of about 120 ft-lamberts.

The flashhead 28 is attached to the camera body 12 by means of a pivotable mount located within a defined recess (not shown) of the camera body 12. Alternatively, the flashhead 28 could also be externally mounted to the camera body 12; the precise location of the flash assembly relative to the camera 10 is not necessarily essential to the workings of the present invention.

A flash position sensor 34, such as an electrical switch is located adjacent the flashhead 28. The switch 34 is opened when the flashhead 28 is in the direct flash position 29, FIG. 3, and is closed by the flashhead 28 when the flashhead is pivoted into the indirect flash position 31, FIG. 1.

Still referring to FIGS. 1-3, a controller 36, such as a microprocessor having programmable logic is conveniently disposed within the camera body 12, FIG. 1. The controller 36 is electrically interconnected to the shutter release button 18, the shutter mechanism 16, the film speed detector 24 and the flash position sensor 34. In addition, the controller 36 is also electrically connected to an ambient light sensor 35 which is attached to the camera body 12 adjacent the taking lens 14, as well as to an indicator 38, such as an LED, which is positioned along the camera body 12. FIG. 3 more clearly illustrates the interconnections of the above elements to the controller 36.

Figure 4:
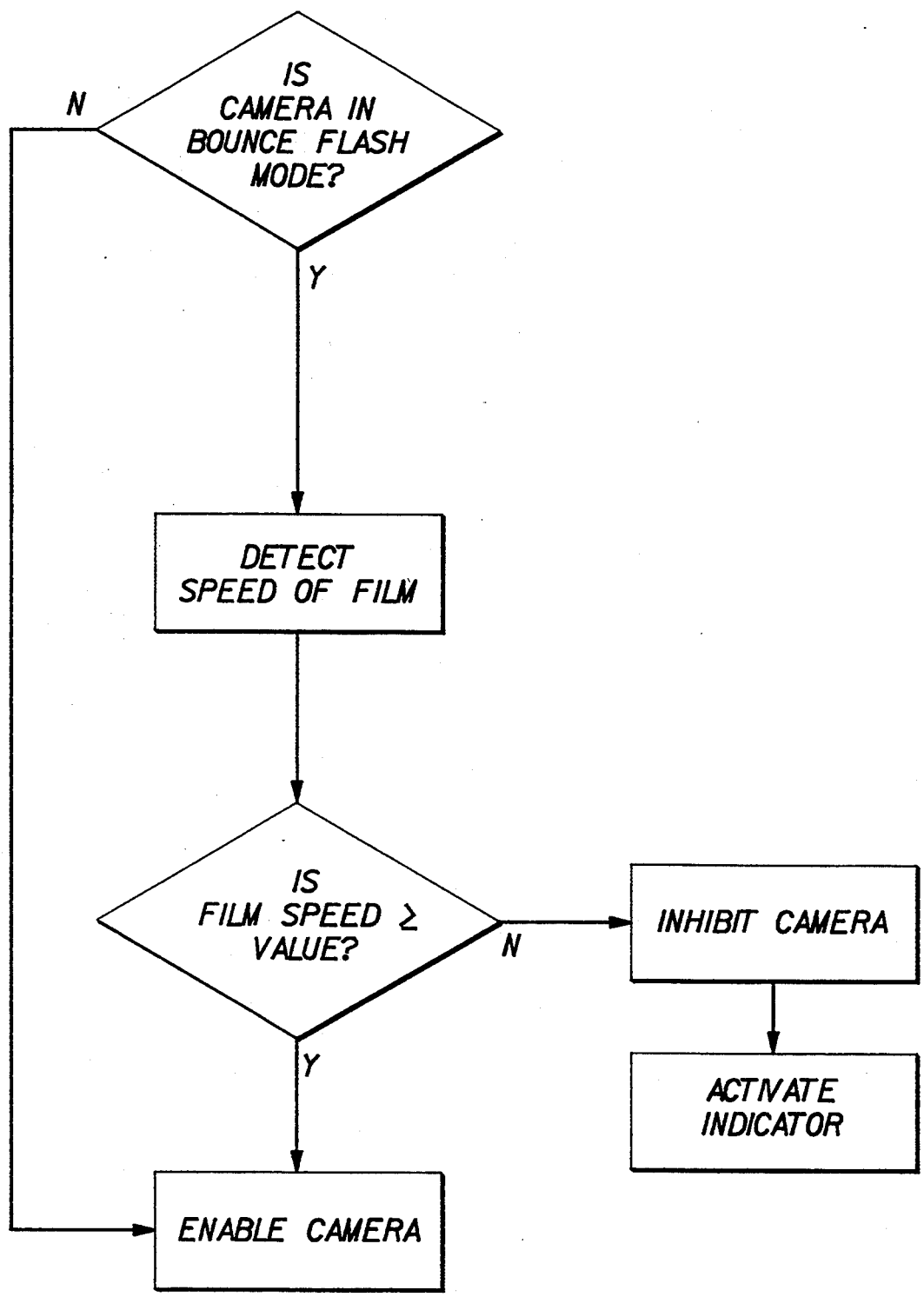
FIG. 4 is a logic diagram illustrating the operational mode of the camera described by FIGS. 1-3.

Referring in particular to the logic diagram of FIG. 4, the operation of camera 10 will now be described in greater detail. In the following discussion, the picture taking is assumed to be taken indoors under lighting conditions which would typically require that a flash apparatus be used.

In this example, a cartridge 20 of ISO 200 film is loaded into the camera body 12. The taking lens 14 is pointed at a scene (not shown) to be photographed. The ambient light sensor 35, as is conventionally known, can be activated automatically by removal of a lens cover of the camera (not shown) or when the camera is picked up by a user. The sensor 35 receives light and provides input for the controller 36. The degree of ambient light available determines whether additional flash illumination is necessary. In addition, the activation of the sensor 35 prompts the controller 36 to begin charging of the flash system.

If sufficient light is available, the camera 10 is ready for firing by depression of the shutter release button 18 which causes the shutter mechanism 16 to open in synchronicity with the exposure control present in the camera, as is conventionally known. The flashtube 30 is not fired.

If insufficient light is available, however, the controller 36 determines whether switch 34 has been closed which indicates the flashhead 28 has been set to the indirect flash position 31. If the switch 34 is closed, a signal is transmitted from the controller 36 to enable the film speed detector 24. The film speed detector 24, makes electrical contact with the pattern field 22 of the cartridge 20 in order to sense the speed of film contained therein. If the speed of the film contained within the cartridge 20 as sensed by the detector 24 is less than ISO 400 (a predetermined value stored in the memory of the controller 36, as in this described example), the controller proceeds to inhibit the camera 10 from exposing the film by disabling the shutter release button 18 from opening the shutter mechanism 16. At the same time, the controller 36 also activates the low film speed indicator 38 to produce a visible signal notifying the user that the camera 10 has been disabled.

In order to continue to use the camera 10, the user must either remove the film cartridge 20 from the camera 10 in order to substitute a higher speed film or manually set the pivotable flashhead 28 to the direct flash position 29.

If the flash assembly 26, as detected by the switch 34, is already set to the direct flash position 29, then the controller 36 allows the shutter release button 18 to open the shutter mechanism 16 to operate and allow picture taking without recourse to the film speed detector 24.

Figure 5:
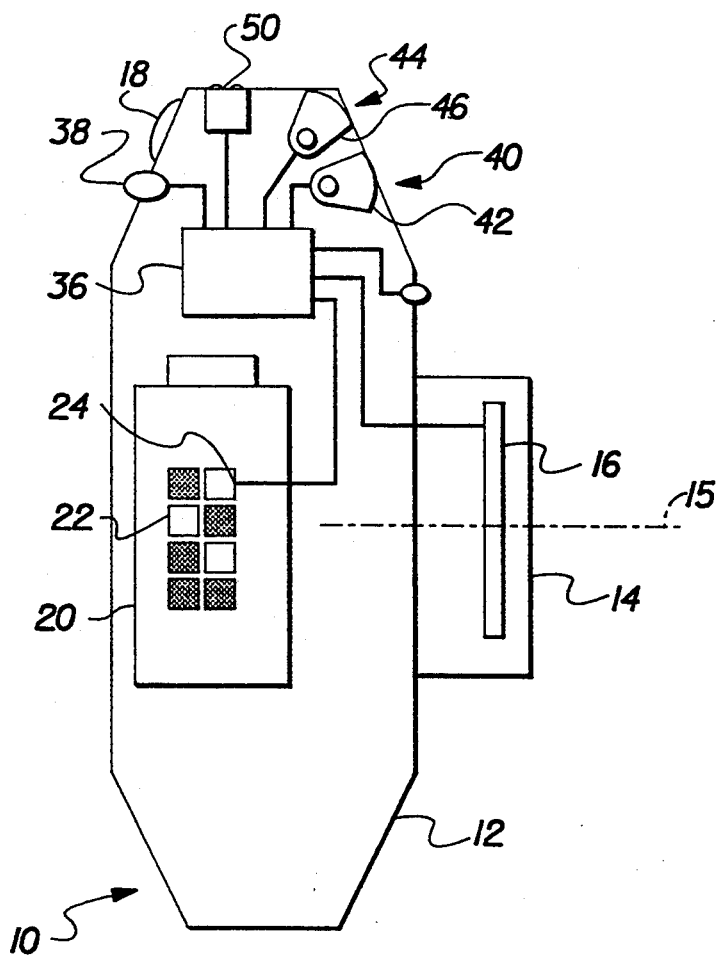
FIG. 5 is a side elevational view of a camera having an electronic flash unit according to another preferred embodiment of the present invention.
Figure 6:
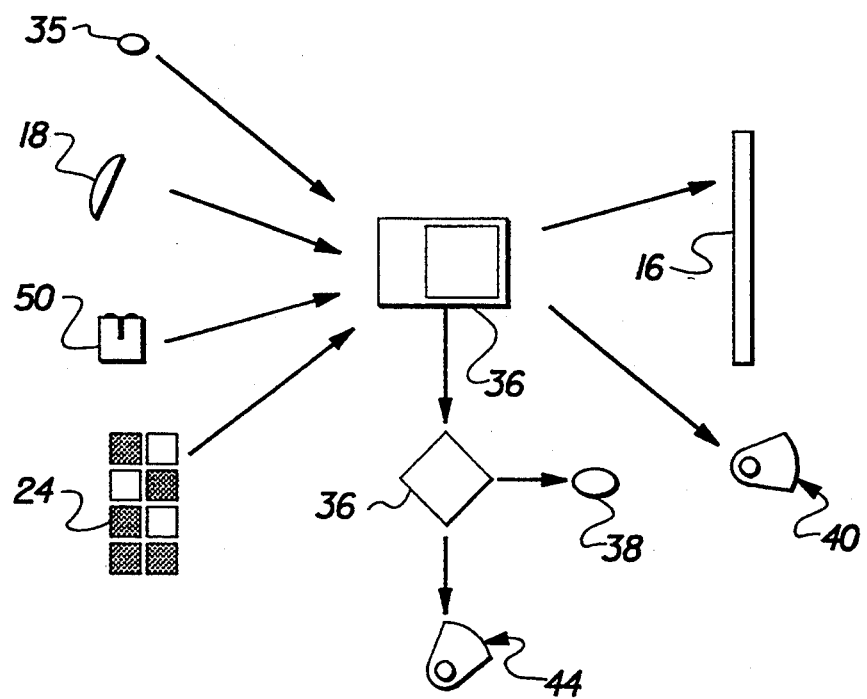
FIG. 6 is a schematic diagram of the control system of the camera shown in FIG. 5.
Figure 7:
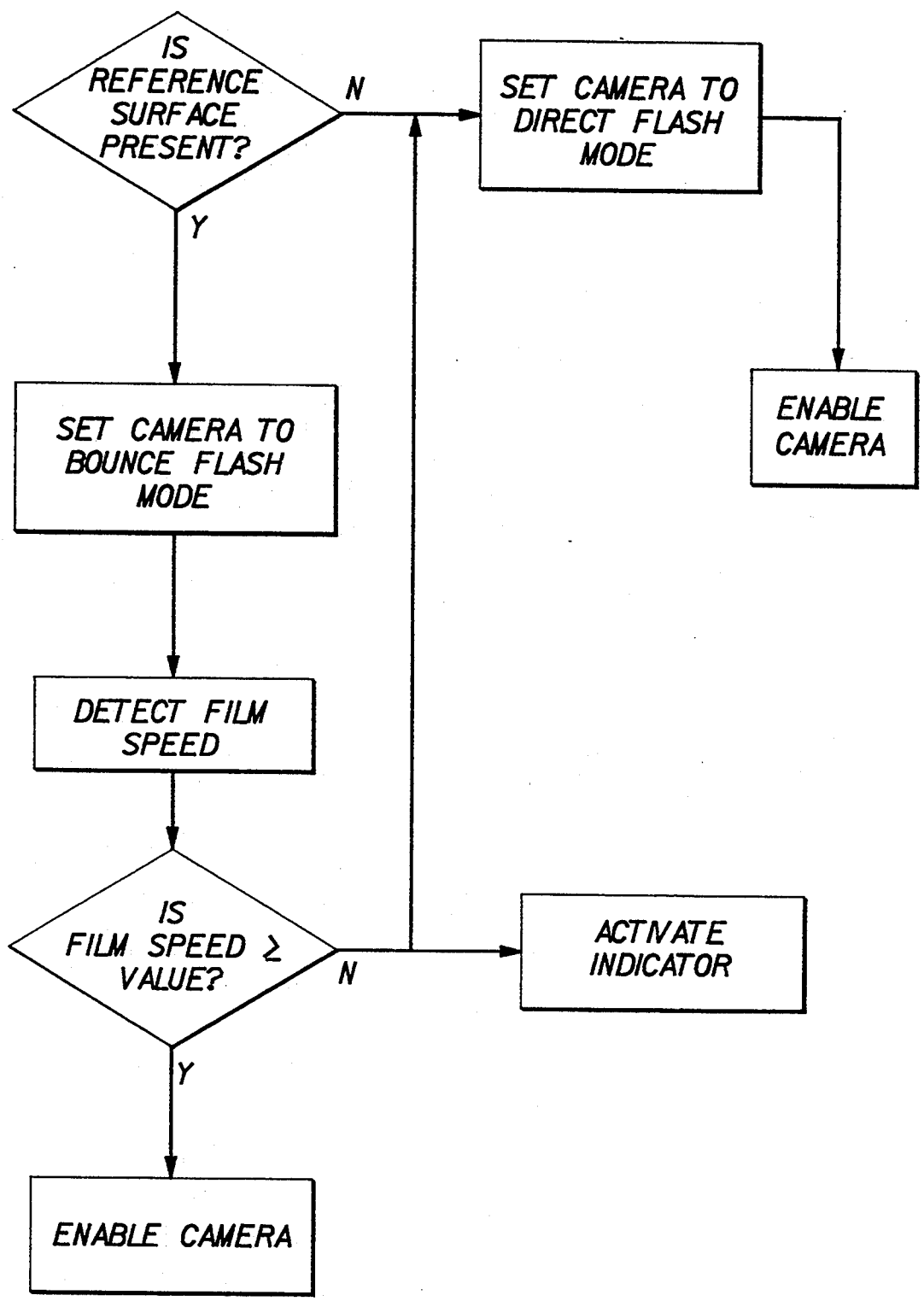
FIG. 7 is a logic diagram of the camera shown in FIGS. 5-6.

Referring to FIGS. 5-7, a second embodiment of the present invention is herein described. Similar parts which have previously been described in the first embodiment are herein given the same reference numerals for convenience.

Specifically according to FIG. 5, a camera 10 is described having a body 12, a taking lens 14 fitted to the body, a shutter mechanism 16 and a corresponding shutter release button 18, as are conventionally known.

A reference surface detector 50, which senses the presence of a wall or ceiling necessary for bounce flash is also provided. In order for bounce type flash illumination to be effective, there must be a reference surface (or bounce surface) present from which a flash of light from the flash assembly 40 can be bounced (reflected). If the camera 10 is held horizontally, this surface is typically the ceiling. Alternatively, if the camera 10 is held vertically, the reference surface corresponds to a wall.

The reference detector 50, such as an infrared triangulation auto-focusing system, as described in U.S. Pat. No. 5,049,916, issued to O'Such, et al, provides a ceiling detection signal which is indicative of the existence of an appropriate bounce surface. The detector 50 is placed atop the camera body 12 as shown in FIGS. 5 and 6 to allow the upward projection of an IR beam.

Depending on the cost and sophistication of the system and the control electronics, the reference surface detector 50 can provide either a binary (YES/NO ie: does a suitable bounce surface exist or not?) signal, or an actual distance as measured from the top of the camera 10 to the reference surface can be displayed in a display window (not shown).

A pair of electronic flash assemblies, a direct flash assembly 40 and an indirect flash assembly 44 are included, each having a flashtube 30, FIG. 1 and a trough shaped reflector 32, FIG. 1 provided as adjacent flashheads 42, 46 fixedly mounted within the camera body 12.

The camera is able to assume either a direct flash mode or an indirect flash mode by activation of either flash assembly 40, 44 as described below.

Still referring to FIGS. 5 and 6, the operation of the camera 10 is maintained by a controller 36, such as a microprocessor, which is positioned within the camera body 12 and is electrically connected to flashheads 42, 44, as well as to the shutter release mechanism 18, the film speed sensing mechanism 24, the reference surface detector 50, a bounce inhibit indicator, such as an LED 38 and an ambient light sensor 35 which is attached to the camera body 12 adjacent the taking lens 14.

The operation of the described camera will now be described with reference to FIGS. 5-7. The camera 10 is first pointed at a subject to be photographed. Initially, the ambient light sensor 35 senses the amount of ambient light present to determine whether either flash mode should be enabled. At the same time, the controller 36 begins charging of the variable capacitor (not shown) which will supply power to either of the flash systems.

If there is sufficient light for picture taking then the camera 10 can be used by depressing the shutter release button 18 which allows the shutter mechanism 16 to allow light into the camera through the taking lens 14 to expose the film. The flash is not fired.

If insufficient light for picture taking is present, the controller 36 enables the reference surface detector 50 which emits an IR beam to determine the presence of a reference surface (not shown). If no reference surface is detected by the reference detector 50, a signal is transmitted back to the controller 36. The controller 36 then sends a signal which enables the direct flash assembly and flashtube 30, FIG. 2 for firing. The camera 10 is then enabled for direct flash and normal operation of the camera is permitted; that is, the shutter mechanism 18 is opened upon depression of the shutter release button 18 to allow picture taking using the direct flash assembly 40 which fires in synchronicity with the release of the shutter.

If, however, a reference surface is sensed by the detector 50, then this input transmitted to the controller 36 causes the controller to enable the film speed detector 24 to establish contact with the electrodes on the pattern field 22 of the cartridge 20. The controller 36 then receives input from the film speed detector 24 which sends a signal corresponding to the coded information present on the pattern field 22 corresponding to the speed of the film contained therein. When compared to a stored value within the nonvolatile memory of the controller 36, if the speed of the film is above or equal to this stored value, the camera 10 is enabled for picture taking in the indirect flash mode. The controller 36 sends a signal to the indirect flash assembly 44 for firing in synchronicity with the shutter mechanism 16 when the shutter release button 18 is depressed.

If the speed of the film is below ISO 400, however, the receipt of this input from the film speed detector 24 causes the controller 36 to automatically inhibit operation of the camera 10 in the indirect flash mode, that is, exposure of film is not permitted using flash assembly 44. No signal is provided from the controller 36 to begin charging the indirect flash assembly 44. Instead, the controller 36 automatically causes the charged output of the variable capacitor (not shown) to be directed to the direct flash assembly 42. In parallel, the controller 36 also sends a signal to activate the LED 38, indicating to the user that the bounce flash has been disabled. Normal operation of the camera 10 occurs by depression of the shutter release button 18 which fires the flash tube 30, FIG. 2 in synchronicity with the opening of the shutter mechanism 16 to expose the film, in a manner conventionally known.

This invention has been described in accordance with preferred embodiments. However, it should be readily apparent that other embodiments are possible that are within the spirit and the scope of the present invention.

Parts List for FIGS. 1-7

10 camera
12 body
14 picture taking lens
15 optical axis 16 shutter mechanism
18 shutter release button
20 film cartridge
21 exterior surface
22 pattern field
24 film speed detector
26 flash assembly
28 pivoting flashhead
29 direct flash position
30 flash tube
31 indirect flash position
32 reflector
34 flash position sensor
35 ambient light sensor
36 controller
38 indicator
40 direct flash assembly
42 flashhead
44 indirect flash assembly
46 flashhead
50 reference surface detector

What is claimed is:

1. A camera capable of exposing various speed films comprising a flash unit capable of alternatively assuming a direct flash mode and an indirect flash mode and a film speed detector for sensing whether film in said camera is above or below a predetermined speed, is characterized by:
controller means connected to said flash unit and said film speed detector for preventing said flash unit from assuming at least one of said flash modes when film in said camera is below said predetermined speed.

2. A camera as recited in claim 1, wherein said controller means allows said flash unit to assume one of said flash modes when film in said camera is below said predetermined speed.

3. A camera as recited in claim 1, further comprising a flash position sensor connected to said controller means for sensing which flash mode is assumed by said flash unit.

4. A camera as recited in claim 1, further comprising indicator means connected to said controller means for indicating when said camera has been prevented from assuming one of said flash modes.

5. A camera as recited in claim 1, wherein the flash illumination output of said flash unit is constant whether said camera is in said direct or indirect flash mode.

6. A camera capable of exposing various speed films comprising a flash unit capable of alternatively assuming a direct flash mode and an indirect flash mode and a film speed detector for sensing whether film in said camera is above or below a predetermined speed, is characterized by:
controller means connected to said flash unit and said film speed detector for preventing said camera from operating when said flash unit assumes at least one of said flash modes and film in said camera is below said predetermined speed.

7. A camera as recited in claim 6, wherein said controller means allows said camera to operate in one of said flash modes when film in said camera is below said predetermined speed.

8. An electronic flash unit comprising means for alternatively assuming a direct flash mode and an indirect flash mode for use with a camera having a film speed detector for sensing whether film in said camera is above or below a predetermined speed, is characterized by:
controller means connectable to said film speed detector for preventing said flash unit from assuming at least one of said flash modes when film in said camera is below said predetermined speed.

9. A flash unit as recited in claim 8, wherein said controller means allows said flash unit to operate in one of said flash modes when film in said camera is below said predetermined speed.

10. A camera capable of exposing various speed films comprising a flash unit capable of alternatively assuming a direct flash mode and an indirect flash mode and a film speed detector for sensing whether film in said camera is above or below a predetermined speed, is characterized by:
controller means connected to said flash unit and said film speed detector for preventing said flash unit from assuming an indirect flash mode when film in said camera is below said predetermined speed.

* * * * *